July 4, 1972  E. GONON  3,674,387
APPARATUS FOR THE PRODUCTION OF CONTINUOUS
LENGTHS OF FOAMED POLYSTYRENE
Filed Sept. 3, 1969  4 Sheets-Sheet 1
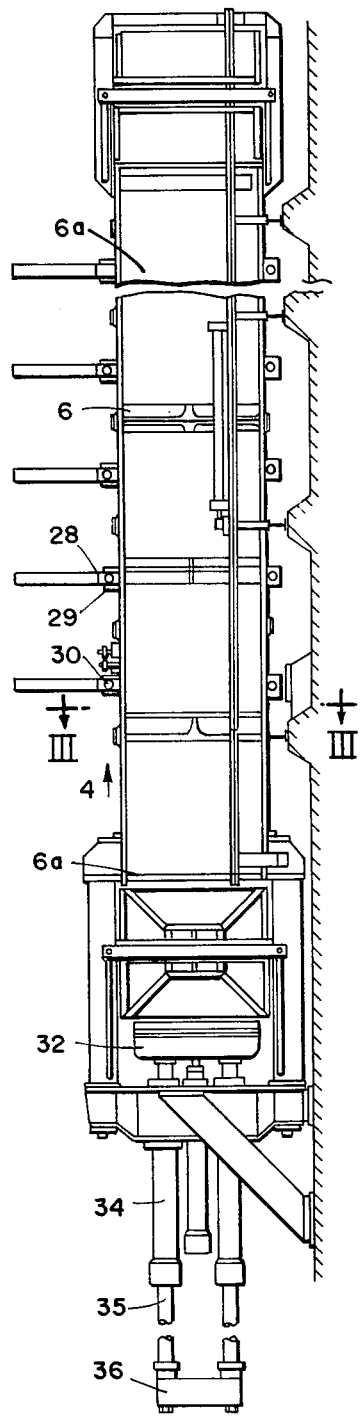
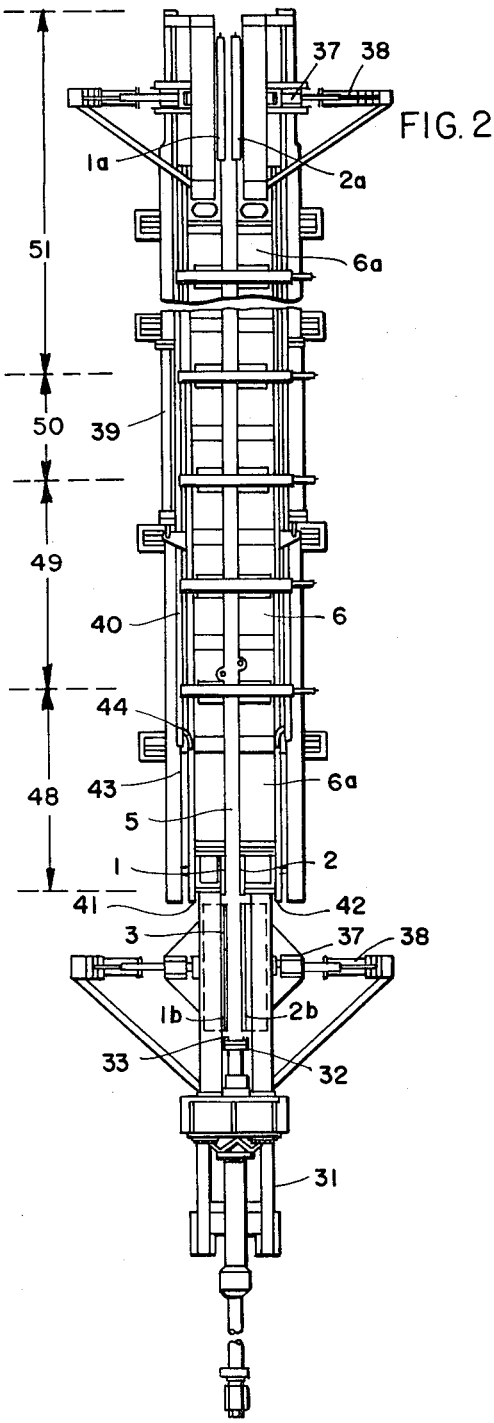
INVENTOR:
EUGEN GONON
BY
Johnston, Root, O'Keeffe, Keil, Thompson & Shurtleff
ATT'YS

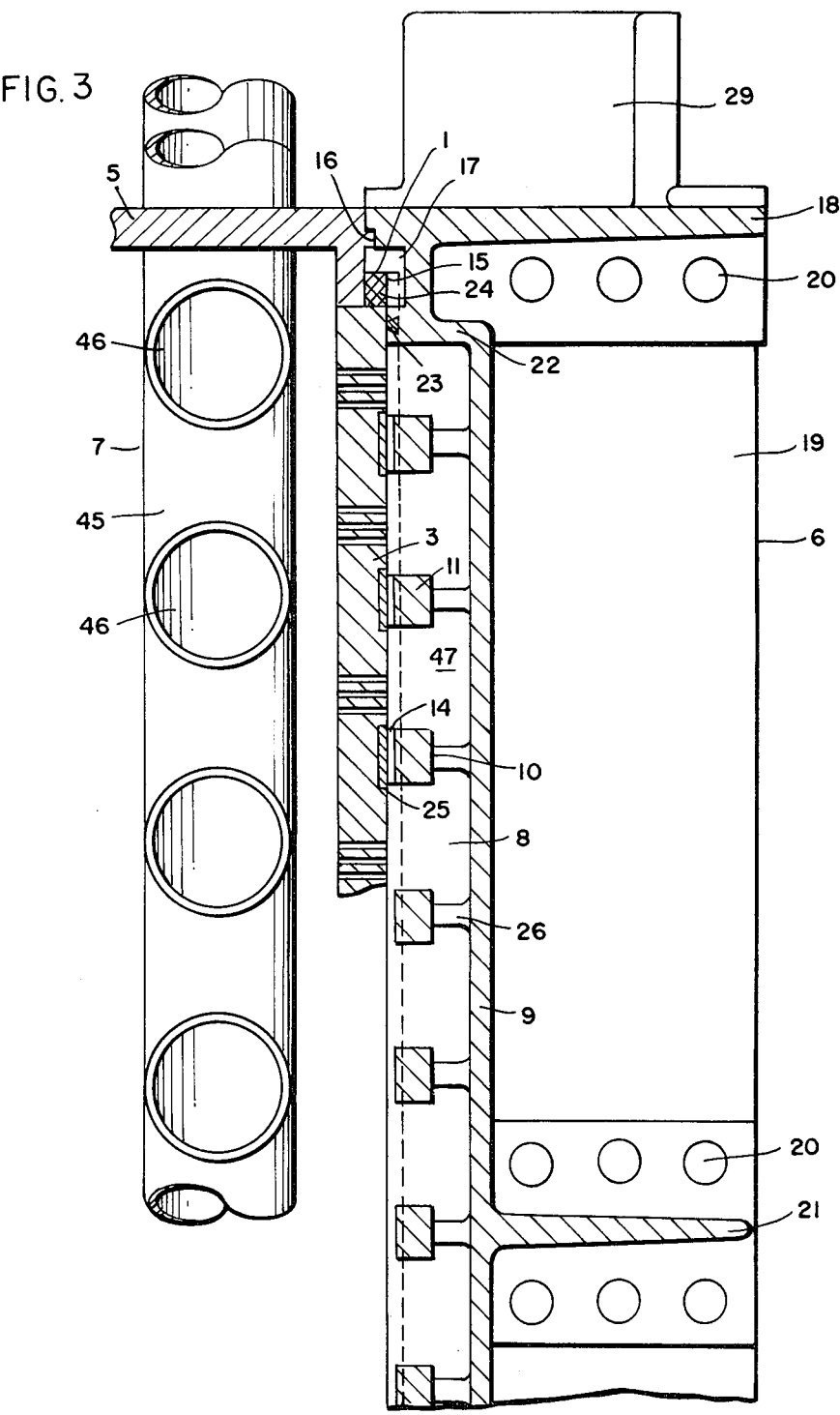

INVENTOR:
EUGEN GONON

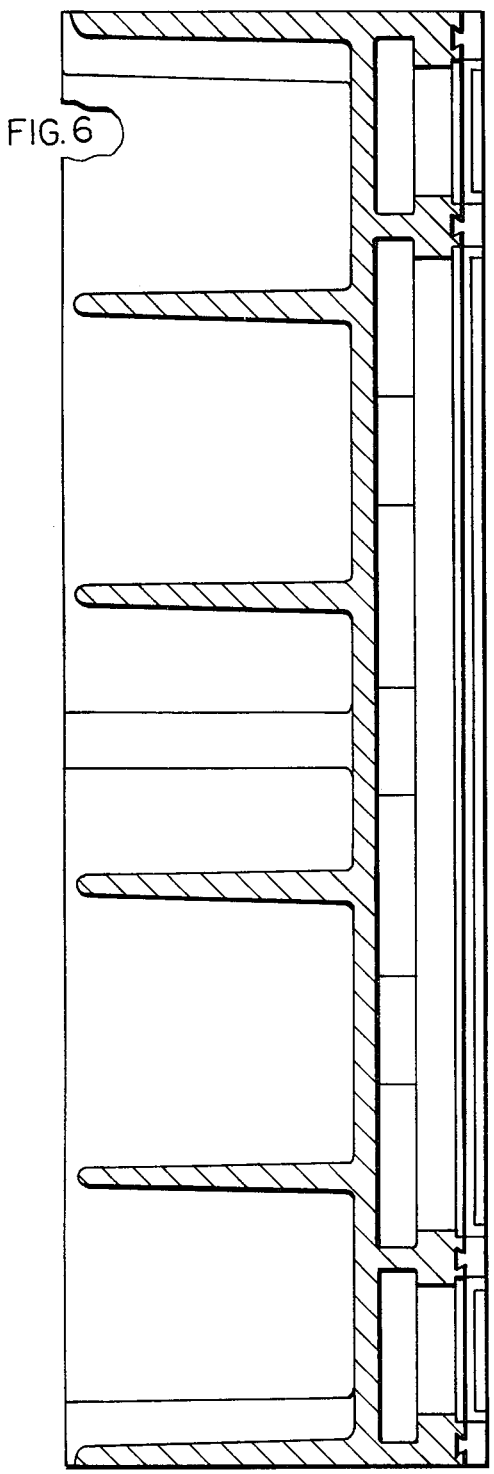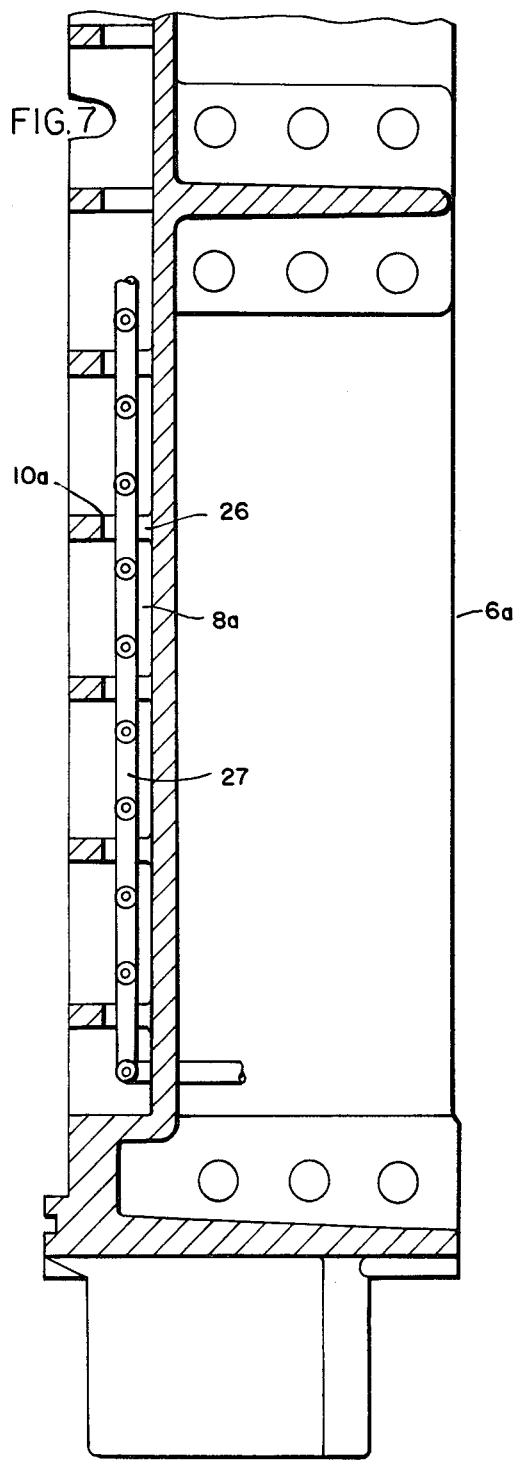

United States Patent Office 3,674,387
Patented July 4, 1972

3,674,387
APPARATUS FOR THE PRODUCTION OF CONTINUOUS LENGTHS OF FOAMED POLYSTYRENE
Eugen Gonon, Schleitheim, Switzerland, assignor to Badische Anilin- and Soda-Fabrik Aktiengesellschaft, Ludwigshafen (Rhine), Germany
Filed Sept. 3, 1969, Ser. No. 854,859
Claims priority, application Germany, Sept. 6, 1968, P 17 79 647.3
Int. Cl. B29d 27/00
U.S. Cl. 425—4                    10 Claims

ABSTRACT OF THE DISCLOSURE

Apparatus for the production of continuous lengths of foamed plastics material, particularly foamed polystyrene, comprising a chamber for the temporary accommodation of the material, which chamber is formed on at least two opposite sides by panels guided on rails and movable by means of a pushing device in the direction of feed of the material.

---

Figure 4:
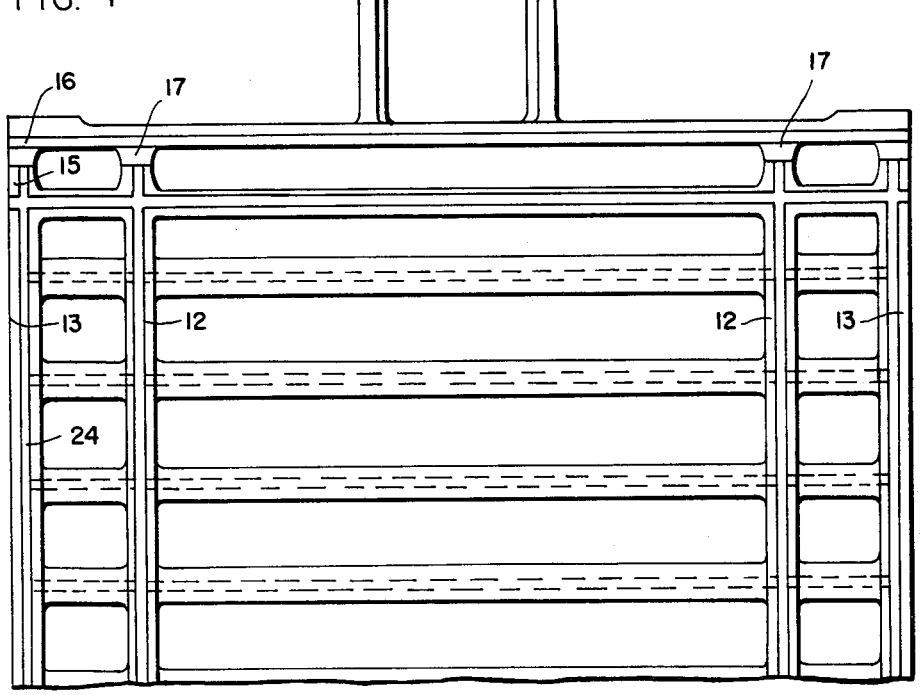

This invention relates to an apparatus for the production of continuous lengths of plastics materials, and more particularly it relates to an apparatus for the production of continuous sheeting of foamed plastics material such as foamed polystyrene, such apparatus comprising a chamber for the temporary accommodation of the material, which chamber is formed on at least two opposite sides by panels guided on rails and movable in the direction of feed of the material.

An apparatus of this kind is known in which the panels are joined together by means of hinges so as to form an endless belt passing round two guide rollers, two such belts forming the lateral boundaries of the said chamber for the material. Those parts of the panel belts which delimit the said chamber at any one time are moved in the direction of feed by traction. With this system it is impossible to achieve a perfect seal, i.e. the complete absence of a gap between adjacent panels, with the result that undesirable irregularities may occur on the surface of the material at points corresponding to the gaps between adjacent panels. Supporting rollers are provided on each side of the panel belts which delimit the said chamber, these rollers being rotatably mounted on axes parallel to the hinge axes of the panels. The panels move past these supporting rollers and, in doing so, tend to execute tilting movements due to their linear contact with each supporting roller, and such movements also lead to an uneven surface of the product.

The object of the invention is to provide an apparatus of the aforementioned type in which a continuous length of foamed material may be produced very accurately and in a simple manner.

According to the invention this object is achieved, in an apparatus of the aforementioned kind, by providing a pushing device (for advancing the panels) which engages the rearmost panel at any one time, the panels being provided with appropriate abutment faces for the transmission of the force applied by the pushing device. In this way the panels are pushed along the rails one in front of the other either in contact with one another or in any other desired manner. The abutment faces may most simply be formed by the vertical surfaces of the sides of the panels so that adjacent panels lie flush against each other.

If, according to another feature of the invention, the guide means for the panels are formed by a series of segments having preferably approximately the same external dimensions and/or connecting means, the length of the said chamber may be varied in a simple manner to suit prevailing conditions, and the use of approximately similar structural elements provides a large number of possibilities in the design of the apparatus.

This feature is further improved by providing at least one pressure chamber on at least one side of the chamber for the temporary accommodation of the material (hereinafter referred to as the extrusion chamber), the partition between the pressure chamber and the extrusion chamber being formed by the panels. A series of pressure chambers may be provided, whose number may be large or small depending on the method used for the treatment of the plastics material being processed, for example with steam during foaming and for example with water during cooling.

According to a further feature of the invention there is preferably provided at the commencement of the extrusion chamber a filling point for plastics material, particularly granular plastics material, the filling means being conveniently in the form of injection means. With such injection means it is possible to provide an air-lock at the inlet end of the extrusion chamber, which air-lock counteracts the pressure of the material expending in the foaming zone and thus provides a seal, i.e. a pneumatic barrier for the foaming zone.

It is partciularly advantageous to provide outer chambers near the foaming zone on each side of the extrusion chamber adn to provide these outer chambers with controllable connections for a foaming medium such as steam. Thus, when making this foamed sheeting for example, it is possible to pass in steam on one side of the extrusion chamber to effect foaming and to allow this steam to escape on the opposite side of the extrusion chamber to enable rapid foaming to take place.

In order to form a buffer zone to seal the foaming zone in advance of its point of commencement, the distance between the foaming point and the filling point is variable, this being achieved, for example, by placing the steam connection at an optional distance from the filling point such that a zone of material forms between the filling point and the foaming point to prevent uneven movement of the plastics material expanding in the foaming zone and the expanding medium, e.g. steam, with the result that the foamed material has a homogenous structure throughout its entire cross-section and the production of cavities is avoided, even in thick foamed material.

Figure 5:
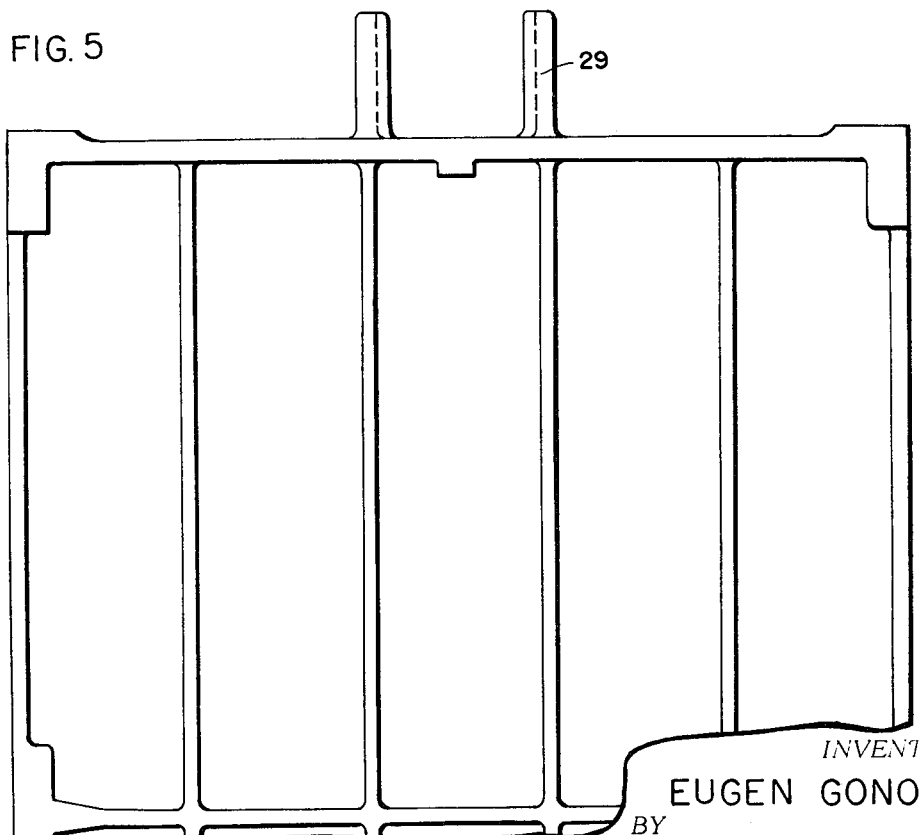

The invention is further described in greater detail with reference to the accompanying drawings, which represent one embodiment of the invention with its essential parts, shown approximately to scale. These parts are, uless directly discernible from the drawings, explained with reference to the drawings, in which:

FIG. 1 is a side view of an apparatus of the invention,
FIG. 2 is a plan view of the apparatus shown in FIG. 1,
FIG. 3 is a section taken essentially on the line III—III of FIG. 1, of part of the apparatus,
FIG. 4 is a view of the segment shown in FIG. 3, as seen from the left,
FIG. 5 is a view of the segment shown in FIG. 3, as seen from the right,
FIG. 6 is a cross-section of the segment shown in FIG. 5, and
FIG. 7 shows another embodiment of a segment essentially as shown in FIG. 3.

As shown in FIGS. 1 and 2, an apparatus of the invention has two rail-type guides 1, 2 located opposite each other for vertical panels 3 which can be moved in the direction of the arrow 4 and which form the lateral boundaries of an extrusion chamber disposed therebetween. The extrusion chamber is delimited at the top and bottom by strips 5 located between the opposed rail guides 1, 2.

Segments 6 and 6a, as shown in FIGS. 3–6 and 7 respectively, are disposed along the extrusion chamber on each side thereof and form the rail-type guides 1, 2 for the panels 3.

The extrusion chamber 7, which has a rectangular vertical cross-section, as shown in FIG. 3, comprises a filling zone 48 followed by a buffer zone 49, a foaming zone 50 and a cooling zone 51, segments of the type shown in FIG. 7 being disposed on each side of the filling and cooling zones, whilst segments 6 of the kind shown in FIG. 3 are located on each side of the foaming zone. All of the segments 6, 6a are alike with respect to their external dimensions and connecting means, and they can therefore be arranged and interconnected in any desired order.

As can be seen from FIG. 3, a segment 6 forms a shallow vertical outer chamber 8 which is delimited on its outside by a vertically disposed wall 9 of the segments. The said wall 9 is provided with parallel webs 10 located one above the other and extending in the direction of feed indicated by the arrow 4, i.e. horizontally, which webs comprise a narrow portion attached to the inside face of the wall 9 and a broader portion 11 forming the free edge of the web. The parallel webs 10 are interconnected by means of vertical ribs 12, 13, which ribs are also attached to the outer wall 9, the inner ribs 12 being at a greater distance from the vertical center plane of the segment than from the outer edges parallel thereto, whilst the outer ribs 13 form the outer, connecting edges of the segment 6. The narrow faces of the enlarged web portions 11 are provided with strips 14 of a material having good sliding properties attached thereto for example by means of screws extending along the webs 11, so that the webs 10 have sliding surfaces for the panels 3.

The segment 6 has two horizontal grooves, one above and one below the chamber 8, which grooves form the rail-type guides 1, 2 for the panels 3. The segment 6 has angular guide faces 15 on the side facing the extrusion chamber 7 and these guide faces form the base and one side of the groove 1 or 2 and are provided only in the region of the vertical ribs 12, 13. Above the upper rail guide and below the lower rail guide there is provided, in each case, a horizontal groove 16 on the inside of each segment 6, which groove is open towards the center plane of the extrusion chamber, its side wall nearest the extrusion chamber being formed by the angle piece 17 providing the guide faces 15. The angle pieces 17 or angle strips extending along the entire length of the segment 6 may be designed as separate parts secured by screws to the segment 6 and consisting of a material having good sliding properties.

The segment 6 has an upper and lower delimiting wall 18 on a level with the grooves 16 and extending outwardly beyond the outer wall 9 of the chamber 8. The delimiting walls 18 are interconnected by vertical side walls 19 which extend outwardly to the same extent as the walls 18. The side walls 19, which are approximately in the plane of the outer ribs 13, are provided with bores 20 in their upper, lower and middle regions, which bores pass at right angles to the said side walls through thickened regions thereof. These bores serve to accommodate bolts for screwing adjacents 6 and 6a together, in which case the said adjacent segments 6 and 6a bear substantially flush against each other at the inner surfaces of their ribs 13. The outer surface of the outer wall 9 is also provided with a horizontal middle rib 21 which is also integral with the side walls 19 and serves to stiffen the segment 6.

The narrow face of the upper and lower horizontal delimiting walls 22 of the chamber 8 is provided, in each case, with a horizontal dovetail groove extending along the entire length of the segment 6 and serving to accommodate a sealing strip 13 of corresponding cross-section, similar dovetail grooves 24 being also provided in the ribs 12 and 13 for the accommodation of sealing strips.

The upper and lower extrusion chamber strip-like walls 5 are fitted in the grooves 16 by way of appropriate tongues. The upper or lower extrusion chamber wall 5 may be formed in one piece extending over the whole length of the extrusion chamber or it may be divided into sections corresponding, say, to the length of the segments 6. At least the side portions of the said walls 5 have sufficient vertical extension as to enable them to form the inner side walls of the guide grooves 1 and 2.

To the upper and lower long edges of each panel 3 there is attached a strip 24 of material having good sliding properties such that each panel 3 is securely guided in the guide rails 1 and 2 disposed vertically one above the other. The panel 3 being guided in the segment 6 has, in each case, strips 25 of material having good sliding properties, these strips 25 being, for example, sunk in the panel 3 and disposed at the levels of the panel-supporting webs 10 to facilitate sliding of the panel against said webs. In addition, the outer surface of the panel 3 bears against the sealing strips 23 disposed in the horizontal and vertical dovetail grooves such that the chamber 8 is sealed from the extrusion chamber 7 by the panel 3 and that locks are formed between adjacent segments 6 by two adjacent vertical ribs 12, 13. Thus each segment 6 has an outer chamber 8 which is sealed off from the outer chambers of its adjacent segments. The narrow portions of the panel-supporting webs 10 are provided with channels 26 so that steam or the like passed into the chamber 8, say from the top, may fill the entire chamber 8.

In FIGS. 3 to 5 only the upper part of the segment 6 is shown, the segment being symmetrical about a horizontal center plane passing through the rib 21.

The segment 6a, of which only the lower portion is shown in FIG. 7, differs from the segment shown in FIGS. 3 to 6 essentially in that the webs 10a are of uniform cross-section along their entire width and are not provided with special slide strips. Moreover, no special sealing strips are provided on these segments 6a.

The extrusion chamber of the apparatus shown in FIG. 1 and FIG. 2 may comprise, at its inlet end, for example four segments 6a made up of two pairs of oppositely located segments. These segments are followed by eight segments 6 made up of four pairs of oppositely located segments and these are in turn followed by sixteen segments 6a made up of eight pairs of oppositely located segments, such that the initial segments 6a form a filling zone, the segments 6 form a foaming zone and the following segments 6a form a cooling zone approximately twice as long as the foaming zone. The segments 6a forming the cooling zone are provided with serpentine tubes 27 disposed in their chambers 8a, the horizontal portions of these tubes being located between the webs 10a and provided with orifices (located side by side) on the side facing the extrusion chamber 7. The connecting portions between the horizontal portions pass through the channels 26 in the webs 10a, and the chamber 8a and the extrusion chamber 7 are provided, in the cooling zone, with suitable water drains.

Each pair of oppositely located segments 6 or 6a is clamped together by clamping means, the extrusion chamber walls 5 being interposed between the said segments. Since the said walls 5 are removably inserted in the grooves 16 of the oppositely located segments 6 or 6a, walls 5 of different widths may readily be used to determine, in the form of distance pieces, the width of the extrusion chamber 7 and thus the thickness of the extruded foamed material. In the center between the abutment faces of the segments 6 or 6a of each pair of oppositely located segments there is provided a clamping device 28 composed or clamping units above and below the segments. Each of the segments 6 or 6a has two spaced lugs 29 on its upper side and two similar spaced lugs 29 on its underside, between which lugs the clamping units may be inserted, each clamping unit having a horizontal clamping spindle 30 extending perpendicularly to the panels 3 and serving to clamp together the two oppositely located segments 6 or 6a.

During the manufacture of a continuous length of foamed material the panels 3 are moved in the guides 1, 2 in the direction of feed, as indicated by the arrow 4, by means of a pushing device 31. This pushing device is located in advance of the inlet end of the extrusion chamber and comprises a horizontally displaceable ram 32 provided with two bifurcations 33 arranged side by side so as to engage the rear edges of the particular panels 3 located at the inlet end of the machine. These two oppositely located panels 3 are thus moved in the direction of feed 4 at exactly the same speed and, since they abut the following panels at their vertical edges, all of the panels situated in the rail-type guides 1, 2 are pushed along, one in front of the other, by the said pushing device. The ram 32, which may be replaceable or may be adjustable to fit different extrusion chamber widths, is secured to the front ends of the piston rods 35 of two superposed cylinder-and-piston units 34, the rear, projecting ends of the piston rods 35 being interconnected by a bridge member 36 to ensure that the said piston rods move at precisely the same speed.

The panels 3 arriving at the outlet end of the extrusion chamber pass into end portions 1a, 2a of the rail-type guides 1, 2, which end portions are secured to push rods 37 which can be moved horizontally at right angles to the panels by means of cylinder-and-piston units 38. When panels arrive in the two oppositely located end portions 1a, 2a of the rail guides these end portions are moved apart horizontally until they come into line with two further rail-type guides 41, 42 disposed on the outer sides of the segments 6, 6a and extending parallel to the rail-type guides 1, 2. The panels thus shifted are then pushed into the said guides 41, 42 and transported back towards the inlet end of the extrusion chamber in the direction opposite to that indicated by the arrow 4. This return movement is effected by cylinder-and-piston units 39 disposed on each outer side of the machine and having piston rods adapted to act on a pusher 40 displaceably mounted on a rail 43 parallel to the rail guides 41, 42. On that side of each pusher 40 which faces the associated rail guide 41 or 42 there are provided dogs 44 which are pivotable against the force of a spring and which are spaced at intervals slightly larger than the length of a panel 3, as measured in the longitudinal direction of the extrusion chamber. As the pusher 40 reciprocates due to the action of the cylinder-and-piston unit 39 the dogs 44 engage the appropriate vertical edges of the panels 3 to move the same against the direction of feed 4 step by step.

The rail guides 1, 2 are preceded by starting portions 1b, 2b which are substantially similar to the end portions 1a, 2a and can be moved towards and away from each other by means of appropriate push rods 37 connected to cylinder-and-piston units 38 such that they are in line with the rail guides 1, 2 in one position and with the rail guides 41, 42 in the other position. The panels arriving at the inlet end of the extrusion chamber after being returned along the guides 41, 42 slide into the guide portions 1b, 2b in line with the guides 41, 42, whereupon these guide portions 1b, 2b are moved towards each other until they are in line with the guides 1, 2 as shown in FIG. 2 and the panels contained therein can be pushed into the rail guides 1, 2 by the ram 32. Thus the panels execute a circulatory movement on each side of the extrusion chamber, this circulatory movement differing from that of a band in that the panels 3 are in the form of completely separate members making them suitable for movement by pushing. Each circulatory movement is in the form of a rectangle. The push rods 37 and the ram 32 are synchronized so that the guide portions 1a, 2a and 1b, 2b always assume the correct position relatively to the rail guides 1, 2 and 41, 42 for the removal or insertion of panels.

At the inlet end of the extrusion chamber there are inserted filling tubes 45, for example from above as shown in FIG. 3, the free ends of these filling tubes being directed in the direction of feed 4. The mouths 46 of the filling tubes, which may be eight in number for example, are arranged vertically in line in the center plane of the extrusion chamber 7. The filling tubes 45, which may be charged through a common channel for example, are connected to an injection device (not shown) such that the filling tubes 45 may be charged with granular plastics material under the action of compressed air, which granular material then passes through the mouths 46 of the filling tubes into the extrusion chamber 7 at its inlet point under the air pressure, the direction of entry of the material being the same as that indicated by the arrow 4. By advancing the panels 3 in the rail guides 1, 2 in the above-described manner the granular material is moved in the direction of the arrow 4 such that it reaches the foaming zone formed by the segments 6. Steam is passed into the outer chamber 8 of at least one of these segments, which steam then flows through orifices 47 in the panels 3 to the extrusion chamber 7 and thus to the plastics material. The orifices 47 are located between the slide strips 25. The granular material in the extrusion chamber 7 is foamed by the action of the steam passing into the said chamber, and the panels 3 are supported against the resulting pressure by the webs 10. The pressure thus applied to the webs 10 is transmitted to the outer wall 9 of the chamber, which wall is provided with ribs on its outer surface, the ribs being arranged at right angles to each other as shown in FIG. 5. The foamed plastics material then passes to the cooling zone formed by the second group of segments 6a, in which the panels 3 are cooled by the water emerging from the serpentine tubes 27. The resulting continuous length of foamed material emerges at the outlet end of the extrusion chamber.

At the outlet end of the extrusion chamber there may be provided a cutting apparatus comprising for example a vertically guided circular saw adapted to cut the foamed material continuously emerging from the extrusion chamber into desired lengths, and an adjustable measuring bar. The cutting apparatus may conveniently be such as to enable the circular saw to cut the foamed material both when moving upwardly and when moving downwardly, the saw moving in the direction of feed 4 with the foamed material during cutting, after which it is returned to its starting position. The movements of the circular saw may be automatically controlled by means of limit switches.

Foaming of the plastics material may be conveniently effected as follows:

Prefoamed granular polystyrene is passed intermittently into the extrusion chamber 7 by air injection and is initially consolidated by allowing a small amount of steam to pass into the extrusion chamber. This produces a prefoamed block which may be readily transported in the direction of feed 4 with the panels 3 to the main foaming zone. Whilst the prefoamed block is passing into the steam-expanding zone, the inlet region of the extrusion chamber is replenished with granular plastics materials. Since granular material is thus constantly charged into the extrusion chamber a buffer region composed of said material is formed between the filling point and the foaming zone, and this buffer region prevents the steam which is passed into the extrusion chamber in the foaming zone from penetrating the filling point and thus escaping. This ensures that the prefoamed material enters the extrusion chamber 7 to completely fill it over its entire cross-section so that no cavities can occur even in relatively thick foamed sheeting, and complete, uniform foaming is ensured over the entire cross-section of the extrusion chamber since the steam cannot escape on account of the said buffer region. This effect is reinforced by the fact that the granular plastics material is charged into the extrusion chamber by air injection. The air pressure counteracts the pressure of the steam introduced into the extrusion chamber and the pressure of expansion occurring in the material during foaming since it forms at the inlet end of the extrusion chamber 7 an air-lock produced by a pressure of several atmospheres for example. The air constantly entering during filling can escape through side openings in the filling zone to keep to said air pressure constant.

The granular plastics material may alternatively be fed into the extrusion chamber 7 in a substantially continuous manner, whilst the advance of the block of plastics material is effected intermittently with the panels 3. As a result of the continuous supply of the granular plastics material, it is continuously built up at the commencement of the foamed block and then moved into the foaming zone with the result that the foamed material is completely homogeneous over its entire length, although foaming is effected in stages. The homogeneity of the foamed material is further improved by allowing the steam to pass from the foaming zone a short distance into the buffer region, its intensity decreasing in the direction towards the filling zone, so that the granular plastics material is gradually subjected to increasing steam pressure as it is advanced towards the foaming zone, and this ensures uniform foaming of the plastics material over the entire length of foamed material.

As mentioned above, the foaming zone is formed by, say, two pairs of oppositely located segments 6, so that two pairs of oppositely located steam chambers 8 are provided in the foaming zone. This number may be increased by adding further segments 6. This has the following advantages: if the foamed material is to have a thin cross-section, the friction and thus the sealing effect of the charged plastics material in the zone before the foaming zone is relatively great. Thus in this case only a relatively small distance is required between the foaming and filling zones to form the buffer zone and the material may be treated with steam as early as in the region of the first segment 6 following the filling point. In this case the introduction of steam is not necessary in the region of the following segments 6 so that cooling will begin to occur in that region. If, however, a longer buffer zone is requiring when making relatively thick foamed material in order to make the buffer zone adequately effective, the first segments 6 following the filling point will not have steam applied thereto. Steam is introduced only in the later segments 6 with the result that the buffer zone is extended, the first and possibly other segments 6 after the filling station forming part of such buffer zone. This is also possible in the manufacture of relatively thin boards. In each case the quality of the foamed material is uniform over its entire length.

Since the foaming zone of the apparatus of the invention has a number of separate steam chambers 8 arranged next to and opposite each other, there are many possible ways of applying steam to the plastics material. In all cases, the steam is passed into the chamber 8 from above in a manner not illustrated so that it passes out at the bottom, where each segment 6 conveniently has a steam trap (not shown). With the apparatus of the invention it is possible, for example. to apply steam to the plastics material from one side only, either from the left or from the right side, and this may be of advantage in the manufacture of relatively thin foamed materials. The steam then passes into the material from one side and passes into the chamber 8 of the opposite segment, from which it can escape. In this opposite chamber 8 the steam is advantageously caused to pass upwardly therein and to leave it at the top, with the result that a uniform steaming effect is achieved over the entire cross-section of the plastics material despite the one-sided application of steam.

To enable each of the chambers 8 to have steam applied thereto as desired, each chamber 8 or each segment 6 is associated with a separate steam feed incorporating a steam regulating valve (not shown). This also makes it possible to control the steam applied to the plastics material in the region of each chamber 8 such that differences in quality on the two sides of the block of plastics material may be evened out and the block may be given a completely homogeneous cross-section before it leaves the extrusion chamber 7. Thus, with the apparatus of the invention, the plastics material may be heated evenly and thus foamed completely uniformly, so that no unequal stresses occur on the two sides of the foamed material and warping is thus avoided.

Similar uniform treatment of the foamed material is also possible in the apparatus of the invention in its cooling zone. The panels 3 are evenly cooled over their entire height and width in the cooling zone formed by the segments 6a by water sprayed from each side or by cold air, and this results in the avoidance of stresses in the foamed material or structural changes in the surface thereof.

In the region of the foaming zone high pressures occur with resulting strain on the panels 3 and segments 6. When the steam is injected at a pressure of, say, 0.7 to 1.0 atmosphere gauge, the panel 3 is stressed in the direction towards the center of the extrusion chamber 7 by the pressure building up within the chamber 8 of the segment 6. The steam then passes into the foaming zone of the extrusion chamber and, consequently, the plastics material foams and the panel 3 is stressed in the opposite direction due to the resulting pressure building up in the extrusion chamber, against which they are supported by the above-described shape of the segments 6. Thus the panels 6 are constantly subjected to alternating loads, against which they are advantageously supported by the above-described design of the apparatus of the invention. The panels 3 themselves may be made of aluminum, wear being minimized by the strips 24 in conjunction with the guide faces of the rail-type guides 1, 2 of suitable material. On account of the above-described design of the apparatus any damage to the panels and deformation thereof due to alternating temperature changes is avoided. In the foaming zone the heat absorbed by the panels is quickly and evenly distributed, whilst the absorbed heat is likewise given off quickly and evenly in the cooling zone, which ensures that the foamed material has a uniform structure and a smooth surface.

A connection for a pressure indicating line is conveniently provided on the steam chamber 8 of the segments 6 next to or opposite the steam connection, the pressure indicating line being connected to a steam regulator. When the steam pressure has reached the desired value, the steam feed is stopped by the steam regulator, steam being fed to the chamber via said regulator whenever the steam pressure in the chamber falls below said desired value.

In the apparatus illustrated in the accompanying drawings the continuous foamed sheeting is manufactured in a vertical plane. However, the sheeting may alternatively be made in, say, a horizontal plane, in which case separate steam inlets will be provided on the upper and lower sides.

The apparatus of the invention may be used to make very dense boards, reefrred to as heavyweight or super heavy-weight panels, which are particularly suitable as exterior wall panels. Such panels have the advantage that they are relatively resistant to indentation and are of relatively high strength.

What I claim is:

1. An apparatus for the production of continuous lengths of foamed plastics material such as foamed polystyrene, comprising a chamber for the temporary accommodation of the material, which chamber is formed on two opposite sides by stationary walls and on the other two opposite sides by panels guided on rails and movable in the direction of feed of the material, wherein there is provided (a) a pushing device for advancing the panels which engages the rearmost panel at any one time, the panels being provided with appropriate abutment faces for the transmission of the force applied by the pushing device,
(b) means for introducing steam into a first portion of the chamber,
(c) means for cooling a second portion of the chamber,
(d) at the exit of the chamber, means for moving the panels from the inside rails to outside rails,
(e) means for moving the panels along the outside rails in the direction opposite to the direction of feed,
(f) means at the entrance of the chamber for returning the panels from the outside rails to the inside rails, and
(g) means for introducing material into the chamber.

2. An apparatus as claimed in claim 1 wherein there are provided, on at least one outer side of the chamber, panel-supporting webs abutting the outer surface of the panel preferably at regular intervals between the outer edges of the panel, as encountered in the direction of feed.

3. An apparatus as claimed in claim 1 wherein the guide means for the panels are formed by a series of segments having the same external dimensions and connecting means.

4. An apparatus as claimed in claim 1 wherein there is provided, on at least one outer side of the chamber for the temporary accommodation of the material, at least one outer chamber, the partition between said outer chamber and said chamber being formed by the said panels.

5. An apparatus as claimed in claim 1 wherein the panels are provided with orifices located between the said panel-supporting webs.

6. An apparatus as claimed in claim 1 wherein a filling point for granular plastics material is provided in the inlet zone of the chamber.

7. An apparatus as claimed in claim 5 wherein the filling means are in the form of injection means.

8. An apparatus as claimed in claim 1 wherein at least one outer chamber following immediately on the foaming zone is provided with a connection for a coolant to form a cooling zone.

9. An apparatus as claimed in claim 1 wherein outer chambers disposed in the region of the foaming zone on each side of the chamber for the temporary accommodation of the material are provided with controllable connections for a heating medium, such as steam.

10. An apparatus as claimed in claim 1 wherein there is provided a common pushing device for the panels on each side of the extrusion chamber, which pushing device has a ram acting on the panels on both sides of the extrusion chamber.

References Cited
UNITED STATES PATENTS

| | | | |
|---|---|---|---|
| 3,262,151 | 7/1966 | Oxel | 18—4 B |
| 3,159,694 | 12/1964 | Wiles et al. | 18—4 R X |
| 3,203,042 | 8/1965 | Axelsson | 18—4 P |

ROBERT D. BALDWIN, Primary Examiner

U.S. Cl. X.R.

425—407, 817, 192, 311, 455